Aug. 1, 1967  R. E. MIERENDORF  3,334,286
CONTROL CIRCUIT HAVING EXCESSIVE POWER LOAD PROTECTION MEANS
Filed June 15, 1964
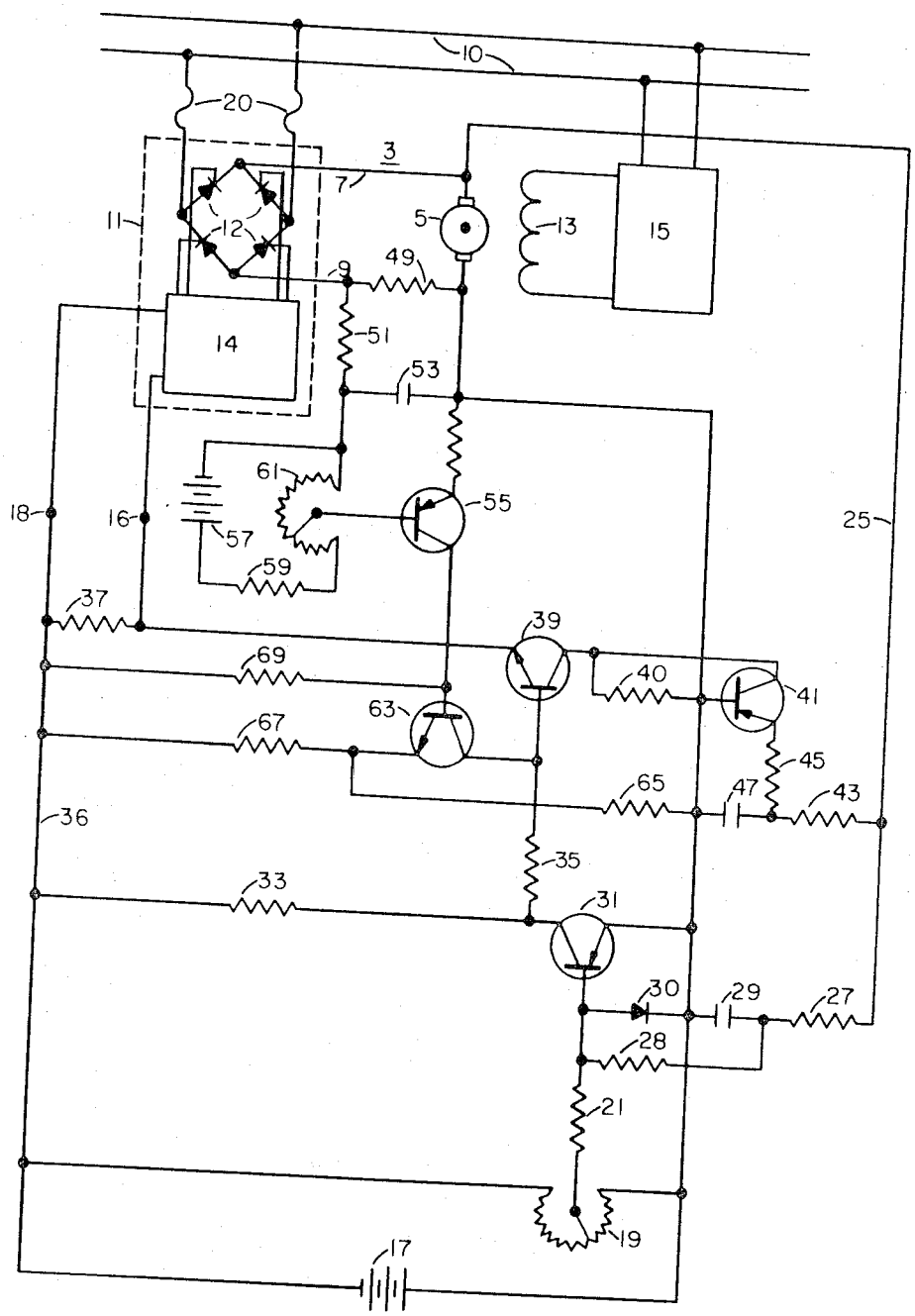
INVENTOR
ROBERT E. MIERENDORF
BY Daniel D. Fetterley
ATTORNEY

United States Patent Office 3,334,286
Patented Aug. 1, 1967

3,334,286
CONTROL CIRCUIT HAVING EXCESSIVE POWER LOAD PROTECTION MEANS
Robert E. Mierendorf, Milwaukee, Wis., assignor, by mesne assignments, to The Louis Allis Company, Milwaukee, Wis., a corporation of Delaware
Filed June 15, 1964, Ser. No. 375,398
9 Claims. (Cl. 318—345)

The present invention relates to control circuits, and more particularly to control circuits for providing a controlling signal to electronic power circuitry associated with electro-mechanical apparatus and for protecting the electronic power circuitry from excessive power loads. This invention may find application in a direct current drive having a D.C. motor and an electronic power amplifier for controlling the armature voltage, and hence the speed, of the motor. A control circuit of the type described and claimed in this patent may be employed to provide a speed controlling signal to the power amplifier and to protect the electronic components contained therein from high power loads which otherwise would be encountered during certain operational sequences.

Control circuits are utilized to regulate the operation of electro-mechanical apparatus to desired operative conditions by providing a controlling signal to the power circuitry energizing the apparatus. To perform this function, the control circuit is provided with a reference signal corresponding to the desired operative conditions in the apparatus and a feedback signal from the apparatus corresponding to actual conditions in the apparatus. These two signals are compared by the control circuit, and the difference signal therebetween is applied by the control circuit to the power circuit of the apparatus and thence to the apparatus to change the conditions therein. The difference signal is applied by these circuits in a manner tending to reduce its magnitude; that is, to bring actual conditions in the apparatus into accord with desired conditions.

The power circuitry associated with the electro-mechanical apparatus is most commonly a high-gain amplifier. Thus, a small change in the reference-feedback difference signal input supplied by the control circuit to the power circuit will provide a correspondingly large change in the output of the power circuit, tending to correct immediately the discrepancy between desired conditions and actual conditions in the apparatus. This prevents the difference signal from attaining significant size in most instances, as the control and power circuits constantly operate to reduce its magnitude. The high-gain amplifier power circuitry is, therefore, designed for operation with a small difference signal input.

However, difference signals of considerable magnitude are encountered during apparatus operation in at least two situations. When the apparatus is started up, a large difference signal occurs, as there is a reference signal being supplied to the control circuit but no feedback signal since the apparatus is initially not operative. Also, when the reference signal is changed rapidly to call for different conditions in the apparatus, there is a large difference signal between the reference signal and the feedback signal until actual conditions in the apparatus again approach the desired ones.

These large difference signals will, of course, produce an extremely large output from the power circuitry because of the high-gain characteristics of the power circuit. In the past, rotary power supplies, such as rotary generators, have been employed to energize the electro-mechanical apparatus. These machines have a sufficiently large thermal time-constant to handle, without damage, the aforementioned high power outputs for the relatively short periods of time during which they occur. However, the development of improved electronic components, in particular semi-conductor transistors and rectifiers, has led to the increased use of these components in electro-mechanical apparatus power circuits. The thermal-time constants of semi-conductor elements are insufficient to handle extremely large power loads, even momentarily. Hence, the high power requirements imposed on the electronic elements of the power circuit during apparatus start-up or during rapid changes in the reference signal inevitably exceed the power handling capability of the electronic elements in the power circuitry, resulting in the activation of protective devices such as fuses, or damage and failure to the electronic elements.

The prior art has generally attempted to solve the problem of electronic component protection by utilizing circuitry to limit the amount of current, and therefore power, that the electronic elements are exposed to. However, current limit circuits are ineffective to provide protection during a start-up of the apparatus, as these circuits require current feedback from the power circuit output to be operative. This is generally not available when the apparatus is started. Similarly, in the instance where the reference signal is rapidly changed, time delays in the current feedback from the apparatus may prevent the current limit circuit from becoming operative in time to prevent damage to the electronic elements by the momentarily high power loads.

It is, therefore, an object of this invention to provide a control circuit for providing a control signal to electronic power circuitry associated with electro-mechanical apparatus and for protecting said electronic power circuitry from excessive power loads.

It is another object of this invention to provide a control circuit which is capable of providing a control signal to electronic power circuitry, which may be limited as to its maximum rate of change and value, to protect said electronic power circuitry from excessive power loads.

Yet another object of this invention is to provide a control circuit which may be adapted for use with a variable speed direct current drive comprising a D.C. motor, a motor field circuit, and an electronic high-gain amplifier power circuit, for providing a control signal to said power circuit and for protecting said power circuit from excessive power loads.

The control circuit described and claimed in this patent accomplishes the above objects by providing a signal to the electronic power circuitry which is proportional to the reference-feedback difference signal when the difference signal is small enough in magnitude not to endanger the power circuitry. Under conditions of large difference signal, such as during start-up or rapid increases in the reference signal, the control circuit initially delivers only a slightly increased signal to the power circuit. This prevents the large difference signal from making damagingly large power demands on the electronic elements in the power circuitry. Subsequent increases to the signal to the power circuit, to bring conditions in the apparatus into accord with conditions demanded by the reference signal, are provided by a system of positive feedback. Thus, the slightly increased control circuit signal, after amplification by the power circuit, is fed back to the control circuit to provide further controlled increases in the signal to the power circuit. This positive feedback process continues until conditions in the apparatus approach the desired conditions indicated by the reference signal or until another power limiting device, such as a current limit circuit, becomes operative.

Further advantages and features of the present invention relate to the particular arrangement and structure whereby the above identified and other objects of the invention are obtained. The invention, both as to its structure and mode of operation, will be better understood by reference to the following specification and drawing, forming a part thereof, wherein:

The single figure is a schematic diagram of the control circuit in accordance with the present invention.

Referring to the single figure, a control circuit in accordance with the present invention is indicated by the numeral 1. The associated electro-mechanical apparatus is shown as an adjustable speed direct current drive and is indicated by the numeral 3. This drive comprises direct current motor 5, positive armature voltage conductor 7, negative armature voltage conductor 9, and high-gain amplifier power circuit 11. Power circuit 11 is connected to alternating current supply lines 10 through fuses 20. Power circuit 11 converts alternating current power from supply lines 10 to direct current by means of electronic elements such as semi-conductor controlled rectifiers 12. The amount of power supplied to D.C. drive 3 by power circuit 11 is determined by the conduction intervals of controlled rectifiers 12, which are controlled by firing circuit 14. Firing circuit 14 is connected to the output of control circuit 1, appearing across output terminals 16 and 18, in a manner such that the power supplied to D.C. drive 3 by power circuit 11 is proportional to the control signal provided to firing circuit 14 by control circuit 1. Motor field 13 is powered by field power circuit 15.

Control circuit 1 is energized by a power supply, shown illustratively as battery 17. This power supply may also be utilized to provide a reference signal corresponding to conditions desired in D.C. drive 3 by employing potentiometer 19 and current limiting resistor 21. The reference signal from the wiper of potentiometer 19 is applied to the emitter-base terminals of transistor 31 as a positive signal tending to turn the transistor on. A feedback signal from D.C. drive 3 is also applied to the base of transistor 31 from positive voltage conductor 25 through resistor 27, filter capacitor 29, current limit resistor 28, and rectifier 30. The feedback signal is proportional to the armature voltage existing in the D.C. drive 3. If motor field 13 is constant, the armature voltage is proportional to speed, and hence may be used to regulate that condition. The feedback signal is a negative signal, in opposition to the reference signal from potentiometer 19, and tends to turn transistor 31 off. The difference signal between the above mentioned signals applied to the base of transistor 31 forms the input signal to control circuit 1.

The emitter-collector circuit of transistor 31 is connected across power supply 17 and in series with resistor 33. Resistor 33 is connected in parallel with a series circuit comprised of resistor 35, transistor 39, and resistor 37. More specifically, transistor 39 is connected in a common collector or emitter follower configuration, having resistor 35 in the base circuit and resistor 37 in the emitter circuit. Due to the high input impedance characteristics of a transistor in the emitter follower configuration, the major portion of the voltage produced across resistor 33 by the emitter-collector current of transistor 31 will appear across the input of transistor 39 and hence resistor 37. The voltage developed across resistor 37 appears at terminals 16 and 18, and serves as the output signal of control circuit 1 to power circuit 11. The collector of transistor 39 is connected through resistor 40 to power supply 17.

Transistor 41 is connected in the common base mode, having the emitter connected to the positive armature conductor 25 through current limiting resistor 43, bias resistor 45, and filter capacitor 47. The collector of transistor 41 is connected to the collector of transistor 39, in shunt with resistor 40. The base of transistor 41 is connected to power supply 17.

A current limiting circuit includes sensing resistor 49 in the negative armature voltage conductor 9 of D.C. drive 3. This resistor is connected in parallel with resistor 51 and capacitor 53. This parallel circuit is connected to the emitter-base circuit of transistor 55. The emitter-base circuit of transistor 55 also contains a current reference circuit comprised of a reference source, shown illustratively as battery 57, resistor 59, and potentiometer 61. The wiper of potentiometer 61 is connected to the base of transistor 55. The collector, or output, of transistor 55 is connected to the base of transistor 63 and resistor 69. The emitter of transistor 63 is connected to bias resistors 65 and 67. The collector of transistor 63 is connected to the base terminal of transistor 39.

As previously noted, control circuit 1 operates to provide a signal to power circuit 11, proportional to the difference between the reference signal and the feedback signal when said difference signal is so small as to not make dangerous power demands on the semi-conductor controlled rectifiers 12 of power circuit 11. When a large difference signal is applied to control circuit 1, control circuit 1 provides a control signal which is limited both as to the maximum rate of change and as to value, to protect the electronic elements in power circuit 11. The operation of control circuit 1, first under conditions of small difference signals and then under conditions of large difference signals, is described in detail below.

When control circuit 1 and power circuit 11 are regulating conditions in D.C. drive 3 to a constant value as determined by a constant reference signal, such control is generally accomplished by small difference signals. Thus, if the speed of D.C. motor 5 varies, even slightly, from that demanded by the reference signal, the variance appears as a difference signal input to control circuit 1. That circuit supplies a signal to power circuit 11 in a manner to correct the variance. The high gain of power circuit 11 provides for prompt correction, preventing the difference signal from getting too large.

The difference signal is applied to the base of transistor 31, resulting in a current flow from the collector of transistor 31 and the development of a voltage proportional to the difference signal across resistor 33 in the collector circuit of transistor 31. The voltage across resistor 33 also appears across the parallel circut of resistor 35, the base-emitter circuit of transistor 39, and resistor 37, and serves as an input signal to transistor 39.

The emitter-collector circuit of transistor 39 is partially supplied with emitter-collector current from the emitter-collector circuit of transistor 41. The emitter-collector current of transistor 41 is proportional to armature voltage conditions in D.C. drive 3, as the emitter of transistor 41 is connected to conductor 25. Additional emitter-collector current for transistor 41 is provided by power supply 17 through resistor 40. The current through resistor 40 is proportional to the voltage across it, which is the difference between the voltage across resistor 37 in series with it and power supply voltage 17. The emitter-collector current of transistor 39 produces a voltage across resistor 37. This voltage is supplied to output terminals 16 and 18 as the output signal of control circuit 1. Transistor 39 uses only as much of the collector current available from the collector of transistor 41 and through resistor 40 as is demanded by the base-emitter signal to transistor 39. As the base-emitter signal to transistor 39 is proportional to the voltage across resistor 33, and therefore the difference signal applied to control circuit 1, the output signal of control circuit 1 will be proportional to the difference signal.

For example, if the armature voltage and speed of D.C. motor 5 decrease from the level sought to be established by the reference signal, the feedback signal decreases, increasing the difference signal between it and the reference signal. The increased difference signal is applied to the base of transistor 31, increasing the emitter-collector current of transistor 31, the voltage across resistor 33, and the base-emitter signal to transistor 39. The greater base-emitter signal increases the emitter-collector current of transistor 39 and hence the voltage across resistor 37 and the output signal at output terminals 16 and 18. It may be noted that, while the emitter-collector current from transistor 41 is decreased due to the decreased armature voltage feedback, there is sufficient emitter-collector current available through resistor 40 to permit emitter-collector current increases by transistor 39 in response to base-emitter signal increases caused by small difference signal increases. The increased control signal at terminals 16 and 18 increases the output of power circuit 11, increasing armature voltage and bringing the speed of D.C. motor 5 up to the desired level.

Control circuit 1 operates in a similar but opposite manner to reduce motor speed and armature voltage, should they increase in relation to the reference signal.

Control circuit 1 operates in the following manner during start-up or rapid changes in the reference signal, to provide a signal to power circuit 11 which has a controlled rate of increase and a limited maximum value. The limited signal prevents the sudden surge of power through power circuit 11, which would otherwise occur due to the large difference signal present during these instances, from triggering fuses 20 or damaging semi-conductor controlled rectifiers 12.

A large difference signal applied to the base of transistor 31 results in maximum emitter-collector current from transistor 31, providing maximum voltage drop across resistor 33 and maximum base-emitter signal to transistor 39. This would ordinarily require maximum emitter-collector current from transistor 39, and hence maximum output signal from control circuit 1.

This large output signal from control circuit 1, unless limited in some manner, would produce a damagingly large current demand on power circuit 11. As previously mentioned, current limit circuits are ineffective to provide a limitation under these circumstances because of time delays or the unavailability of current feedback. Control circuit 1 provides the necessary limited control signal output under these circumstances by limiting the emitter-collector current of transistor 39. The emitter-collector current of transistor 39 is limited to that available from the parallel paths comprised of the emitter-collector circuit of transistor 41 and resistor 40, regardless of the magnitude of the base-emitter current to transistor 39. Thus, upon a large increase in the difference signal, the emitter-collector current of transistor 39, and hence the voltage across resistor 37, can increase instantaneously only to the amount available from the collector of transistor 41 and through resistor 40. The maximum available emitter-collector current from transistor 39 provides for an initial moderate increase in the output of control circuit 1. Further controlled increase in the output of control circuit 1, allowing D.C. drive 3 to attain the speed level required by the reference signal, are provided by a positive feedback process.

The initial moderate increase in the output signal of control circuit 1 increases the output of power circuit 11 and the armature voltage and speed of D.C. drive 3. The increase in armature voltage is fed back to control circuit 1 through conductor 25. The increased armature voltage is filtered and delayed by resistor 43 and capacitor 47, and applied to the emitter-collector circuit of transistor 41. This increases the emitter-collector current of transistor 41. The increased emitter-collector current of transistor 41 results in a greater current in the emitter-collector circuit of transistor 39, and hence a greater voltage across resistor 37 and output signal from control circuit 1. The greater signal from control circuit 1 produces a larger output from power circuit 11 and an increased armature voltage and speed in D.C. drive 3. The larger armature voltage then repeats the above described positive feedback process; that is, the further increase in the armature voltage produces increases in the output of control circuit 1, resulting in additional increases in the armature voltage and speed of D.C. drive 3. This process continues at a rate determined by capacitor 47 until either the increased feedback signal approaches the reference signal, and the small difference signal then existing reduces the base-emitter current and hence emitter-collector current of transistor 39 and the output signal, or until a current feedback appears and the current limiting circuit becomes operative.

The current limit circuit of control circuit 1 provides additional protection to the semi-conductor controlled rectifiers 20 in power circuit 11 by limiting the maximum current that may appear in the armature circuit. As previously noted, current limiting circuitry alone is not sufficient for protection in instances of a large difference signal being applied to control circuit 1, since a current feedback signal must be provided to the current limiting circuitry before it will operate to reduce the current. By the time the current limit circuit senses the increased armature current, the short thermal-time constant of semi-conductor rectifiers 20 will have been exceeded.

The armature current in conductors 7 and 9 produces a voltage across resistor 49 in armature conductor 9. This voltage is filtered by resistor 51 and capacitor 53, and produces an emitter-base current to transistor 55. This emitter-base current can flow only when the voltage across capacitor 53 is greater than the voltage on the wiper of potentiometer 61. The setting of potentiometer 61 controls the value of armature current at which the current limit circuit becomes effective, by preventing emitter-base current flow in transistor 55 when the value of the armature current, as expressed by the voltage across capacitor 53, is less than the maximum desired armature current as determined by the setting of potentiometer 61.

Transistor 55 controls the conduction state of transistor 63. When transistor 63 is non-conducting, the voltage across resistor 33 is applied to the base of transistor 39, and control circuit 1 operates in the above described manner. When transistor 63 is in the conducting state, a low impedance path is provided for the voltage across resistor 33, and the base-emitter signal is effectively removed from transistor 39.

When the armature current is below the maximum desired value, transistor 63 is rendered non-conductive by the current flow through resistors 65 and 67, which makes the emitter of transistor 63 more positive than the base when there is no current through resistor 69 in the base circuit. There will be no current in the base circuit in this instance, as transistor 55 is rendered non-conductive by the voltage across potentiometer 61. With transistor 63 non-conductive, the voltage across resistor 33 is applied to the base terminal of transistor 39, and control circuit 1 functions in the normal manner. When, however, the voltage across capacitor 53 is greater than the voltage at the wiper of potentiometer 61, indicating an excessive current condition in the armature circuit, an emitter-base current will flow in transistor 55. This current is amplified and applied to the base of transistor 63. When this current overcomes the bias on transistor 63 produced by the current flow through resistors 65 and 67, transistor 63 is rendered conductive, shunting the base-emitter current away from transistor 39. This reduces the emitter-collector current of transistor 39, resulting in a decrease in the voltage across resistor 37 and the output signal of control circuit 1, and a corresponding decrease in armature voltage and current.

Thus, the above described control circuit provides for both the control of conditions in electro-mechanical apparatus, by providing a power controlling signal to the power circuitry responsible for conditions in the apparatus; and for the protection of the power circuitry from damage due to large power loads, by limiting the controlling signal in both rate of change and maximum value during instances when large power loads would otherwise be encountered. While the embodiment of the invention described above is at present thought to be preferred, it will be appreciated that modification or alternation may be made therein without departing from the spirit of the invention, and it is intended to include all such modifications as come within the scope of the claims below.

What is claimed is:

1. A control circuit producing a control signal to an electronic power circuit for regulating associated electromechanical apparatus in accordance with the difference signal between a reference signal and a feedback signal and for protecting said power circuit during periods of a large difference signal comprising:

a power supply;
a reference signal source connected to said power supply producing a reference signal corresponding to desired conditions in the apparatus;
means producing a negative feedback signal corresponding to conditions existing in the apparatus;
first transistor means having an input connected to said reference signal source and said means producing a feedback signal and sensitive to the difference signal between the reference signal and the feedback signal and producing an output proportional to said difference signal;
second transistor means connected across said power supply and receiving a limited power signal therefrom, said transistor having an input connected to the output of said first transistor means and an output providing a control signal to the power circuit; and
third transistor means connected to the apparatus and to said second transistor means to supply a positive feedback signal from said apparatus to said second transistor means as a power signal;
whereby the control circuit produces a control signal to the power circuit proportional to the signals supplied to said second transistor means by said power supply and said third transistor means under conditions of a large difference signal between the reference signal and the feedback signal and proportional to the difference signal between the reference signal and the feedback signal under other conditions.

2. A control circuit producing a control signal to an electronic power circuit for regulating associated electromechanical apparatus in accordance with the difference signal between a reference signal and a feedback signal and for protecting said power circuit during periods of a large difference signal comprising:

a power supply;
a reference signal source connected to said power supply producing a reference signal corresponding to desired conditions in the apparatus;
means producing a negative feedback signal corresponding to conditions existing in the apparatus;
first transistor means having an input connected to said reference signal source and said means producing a feedback signal and sensitive to the difference signal between the reference signal and the feedback signal and producing an output proportional to said difference signal;
second transistor means connected across said power supply and receiving a limited power signal therefrom, said transistor having an input connected to the output of said first transistor means and an output providing a control signal to the power circuit;
third transistor means connected to said apparatus and to said second transistor means to supply a positive feedback signal from said apparatus to said second transistor means as a power signal; and
means connected to said second transistor means forming a bypass for the input to said second transistor means to reduce said control signal to the power circuit during extended periods of large difference signal;
whereby said control circuit produces a control signal to the power circuit proportional to the signals supplied to said second transistor means by said power supply and said third transistor means until said bypass means reduces said control signal under conditions of a large difference signal between the reference signal and the feedback signal and proportional to the difference signal under other conditions.

3. A control circuit producing a control signal to an electronic power circuit for regulating associated electro-mechanical apparatus in accordance with the difference signal between a reference signal and a feedback signal and for protecting said power circuit during periods of a large difference signal comprising:

a power supply;
a reference signal source connected to said power supply producing a reference signal corresponding to desired conditions in the apparatus;
means producing a negative feedback signal corresponding to conditions existing in the apparatus;
first transistor means having an input connected to said reference signal source and said means producing a feedback signal and sensitive to the difference signal between the reference signal and the feedback signal and producing an output proportional to said difference signal;
second transistor means connected across said power supply and receiving a limited power signal therefrom, said transistor having an input connected to the output of said first transistor means and an output providing a control signal to the power circuit;
third transistor means connected to the apparatus and to said second transistor means to supply a positive feedback signal from the apparatus to said second transistor means as a power signal;
a first signal means connected to the apparatus sensing the effect of large difference signals in the apparatus and producing a signal corresponding to said effect;
a second signal means producing a signal corresponding to the maximum desired effect of large difference signals in the apparatus;
fourth transistor means connected to said first signal means and said second signal means capable of being turned on when the signal from said first signal means exceeds the signal from said second signal means; and
fifth transistor means connected to said fourth transistor means and to said second transistor means capable of being turned on when said fourth transistor means is in the conducting state to bypass said input signal from said second transistor means and reduce the control signal to the power circuit;
whereby the control circuit produces a control signal to the power circuit proportional to the signal supplied to said second transistor means by said power supply and said third transistor means until said fifth transistor means bypasses said input to said second transistor means under conditions of a large difference signal and proportional to the difference signal under other conditions.

4. A control circuit producing a control signal to an electronic power circuit for regulating associated electromechanical apparatus in accordance with the difference signal between a reference signal and a feedback signal and for protecting said power circuit during periods of a large difference signal comprising:

a power supply;
a reference signal source connected to said power supply producing a reference signal corresponding to desired conditions in the apparatus;
means producing a negative feedback signal corresponding to conditions existing in the apparatus;
first transistor means having an emitter, a collector, and a base, said reference signal source and said means producing a feedback signal connected to said base to produce an input signal corresponding to the difference between the reference signal and the feedback signal, said emitter and collector connected across said power supply and in series with a resistor;

second transistor means having an emitter, a collector, and a base, connected in parallel with said resistor and deriving base-emitter current therefrom, said collector connected to said power supply to provide limited emitter-collector current to said second transistor means;

means in the emitter circuit of said second transistor means furnishing a control signal to the power circuit in accordance with the emitter-collector current of said second transistor means; and third transistor means having an emitter, a collector, and a base, said base connected to said power supply, the emitter-collector circuit of said third transistor means connected to said apparatus and the collector of said second transistor means to provide a positive feedback emitter-collector current proportional to conditions in the apparatus;

whereby said control circuit produces a control signal proportional to the emitter-collector current supplied to second transistor means by said third transistor means and said power supply under conditions of a large difference signal between the reference and feedback signals and a control signal proportional to the difference signal between the reference and feedback signals under other conditions.

5. A control circuit producing a control signal to an electronic power circuit for regulating associated electromechanical apparatus in accordance with the difference signal between a reference signal and a feedback signal and for protecting said power circuit during periods of a large difference signal comprising:

a power supply;

a reference signal source connected to said power supply producing a reference signal corresponding to desired conditions in the apparatus;

means producing a negative feedback signal corresponding to conditions in the apparatus;

first transistor means having an emitter, a collector, and a base, said reference signal source and said means producing a feedback signal connected to said base to produce an input signal corresponding to the difference between the reference signal and the feedback signal, said emitter and collector connected across the power supply and in series with a resistor;

second transistor means having an emitter, a collector, and a base, connected in parallel with said resistor and deriving base-emitter current therefrom, said collector connected to said power supply to provide limited emitter-collector current to said second transistor means;

a resistor in the emitter circuit of said second transistor means furnishing a control signal to the power circuit in accordance with the emitter-collector current of said second transistor means;

third transistor means having an emitter, a collector, and a base, said base connected to said power supply, the emitter-collector circuit of said third transistor means connected to the apparatus and to said collector of said second transistor means to provide a positive feedback emitter-collector current thereto; and means connected to the apparatus and said second transistor means sensitive to the effect of large difference signals in the apparatus and forming a bypass for the base-emitter current of said second transistor means under conditions of a large difference signal to reduce the control signal to the power circuit; whereby the control circuit produces a control signal proportional to the emitter-collector current supplied to second transistor means by said third transistor means and said power supply until said bypass means reduces said control signal under conditions of a large difference signal and proportional to the difference signal under other conditions.

6. The control circuit of claim 5 wherein said means connected to the apparatus and said second transistor means sensitive to the effect of large difference signals in the apparatus and forming a bypass for the base-emitter current of said second transistor means to reduce the control signal to the power circuit comprises:

first signal means connected to the apparatus sensing the effect of large difference signals in the apparatus and producing a signal corresponding thereto;

second signal means producing a signal corresponding to the maximum desired effect of large difference signals in the apparatus;

fourth transistor means connected to said first signal means and said second signal means, capable of being turned on when the signal from said first signal means exceeds the signal from said second signal means; and fifth transistor means connected to said fourth transistor means and to said second transistor means capable of being turned on when said fourth transistor is turned on, to bypass the base-emitter current from said second transistor means and reduce the control signal to the power circuit.

7. In a direct current drive having a motor, an armature circuit and a variable armature power circuit for controlling the speed of said motor, a control circuit providing a speed controlling signal to said power circuit in accordance with a reference-feedback difference signal and protection to said power circuit during periods of a large difference signal comprising:

a power supply;

a reference signal source connected to said power supply producing a reference signal corresponding to desired conditions in said direct current drive;

means producing a negative fedback signal corresponding to conditions in said direct current drive;

first transistor means having an emitter, a collector, and a base, said reference signal source and said means producing a feedback signal connected to said base to produce an input signal corresponding to the difference between the reference signal and the feedback signal, said emitter and collector connected across said power supply and in series with a resistor;

second transistor means having an emitter, a collector, and a base, connected in parallel with said resistor and deriving base-emitter current therefrom, said collector connected to said power supply to provide limited emitter-collector current to said second transistor means;

means in the emitter circuit of said second transistor means furnishing a control signal to the power circuit in accordance with the emitter-collector current of the second transistor means; and third transistor means having an emitter, a collector, and a base, said base connected to said power supply, the emitter-collector circuit of said third transistor means connected to the armature circuit and to said collector of said second transistor means to provide a positive feedback emitter-collector current thereto; whereby said control circuit produces a control signal proportional to the emitter-collecor current provided to said second transistor means and said power supply during conditions of a large difference signal between the reference and the feedback signals and an output signal proportional to the difference signal between the reference signal and the feedback signal under other conditions.

8. In a direct current drive having a motor, an armature circuit and a variable armature power circuit for controlling the speed of said motor, a control circuit providing a speed controlling signal to said power circuit in accordance with a reference-feedback difference signal and protection to said power circuit during periods of a large difference signal comprising:
- a power supply;
- a reference signal source connected to said power supply producing a reference signal corresponding to desired conditions in said direct current drive;
- means producing a negative feedback signal corresponding to conditions in said direct current drive;
- first transistor means having an emitter, a collector, and a base, said reference signal source and said means producing a feedback signal connected to said base to produce an input signal corresponding to the difference between the reference signal and the feedback signal, said emitter and collector connected across said power supply and in series with a resistor;
- a second transistor having an emitter, a collector, and a base, connected in parallel with said resistor and deriving base-emitter current therefrom, said collector connected to said power supply to provide limited emitter-collector current to said second transistor means;
- a resistor in the emitter circuit of said second transistor means furnishing a control signal to the power circuit in accordance with the emitter-collector current of the second transistor means;
- third transistor means having an emitter, a collector, and a base, said base connected to said power supply, the emitter-collector circuit of said third transistor means connected to the armature circuit and to said collector of said second transistor means to provide a positive feedback emitter-collector current thereto; and
- means connected to the armature circuit and said second transistor means sensitive to overload conditions in the armature circuit caused by a large difference signal and forming a bypass for the emitter-base current to said second transistor means under such conditions to reduce the control signal to the armature power circuit;

whereby said control circuit produces a control signal proportional to the emitter-collector current supplied to said second transistor means by said third transistor means and said power supply until said means sensitive to overload conditions reduces said control signal under conditions of a large difference signal and proportional to the difference between the reference signal and the feedback signal under other conditions.

9. The control circuit of claim 8 wherein the means connected to the armature circuit and to said second transistor means sensitive to overload conditions in the armature circuit and forming a bypass for said base-emitter current to said second transistor means under such conditions to reduce the control signal to the power circuit comprises:
- first signal means connected to the armature circuit sensing overload conditions in the armature circuit and producing a signal corresponding thereto;
- second signal means producing a signal corresponding to maximum desired overload conditions in the armature circuit;
- fourth transistor means connected to said first signal means and said second signal means, capable of being turned on when said signal from said first signal means exceeds the signal from said second signal means; and
- fifth transistor means connected to said fourth transistor means and to said second transistor means capable of being turned on when said fourth transistor means is turned on, to bypass the base-emitter current from said second transistor means and reduce the control signal to the power circuit.

References Cited
UNITED STATES PATENTS

| | | | |
|---|---|---|---|
| 3,037,157 | 5/1962 | Young | 318—317 X |
| 3,124,698 | 3/1964 | Semmer et al. | |
| 3,249,840 | 5/1966 | Erikson | 318—345 X |
| 3,262,015 | 7/1966 | McNamee et al. | |

ORIS L. RADER, *Primary Examiner.*

J. C. BERENZWEIG, J. J. BAKER, *Assistant Examiners.*